Sept. 29, 1970      B. A. WARNOD      3,530,697
LOCKING DEVICE, IN PARTICULAR FOR THEFT PREVENTION ON
AUTOMOTIVE VEHICLES
Filed Jan. 2, 1968      4 Sheets-Sheet 1
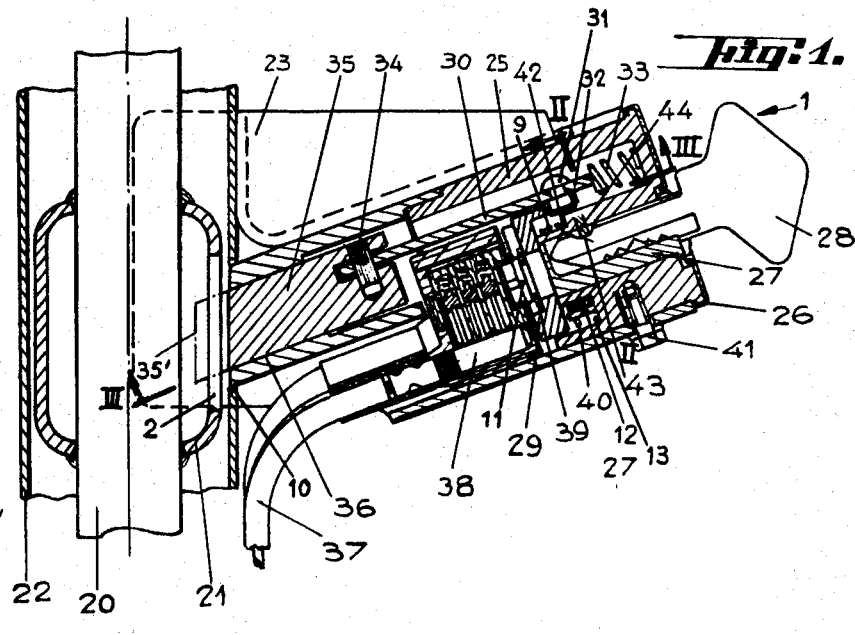
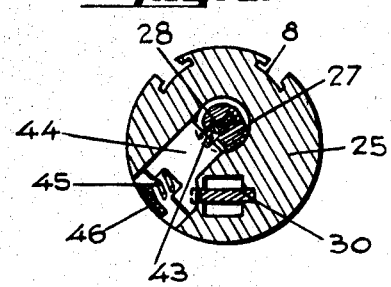
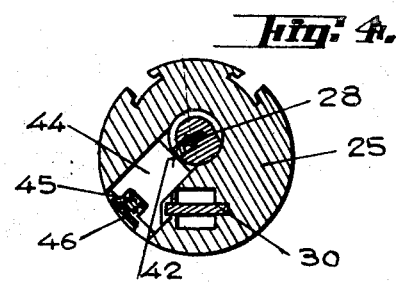
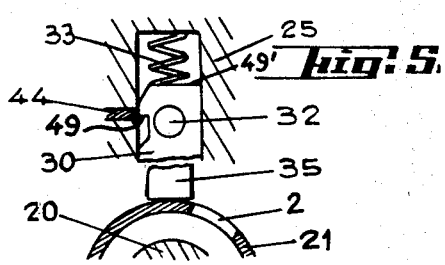
INVENTOR
BERTRAND A. WARNOD
BY: Nolte and Nolte
ATTORNEYS

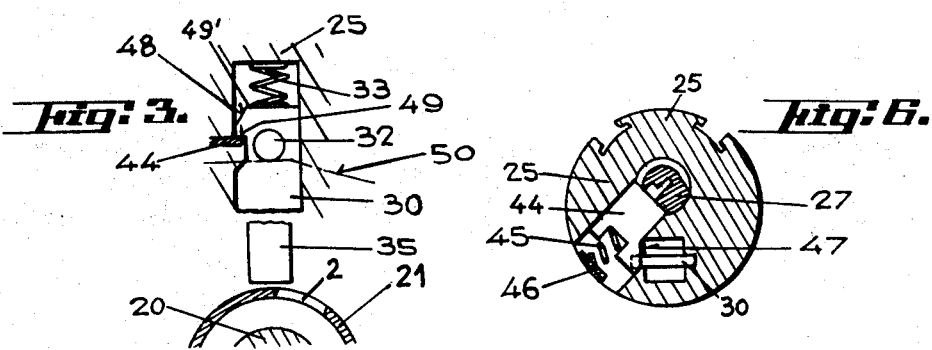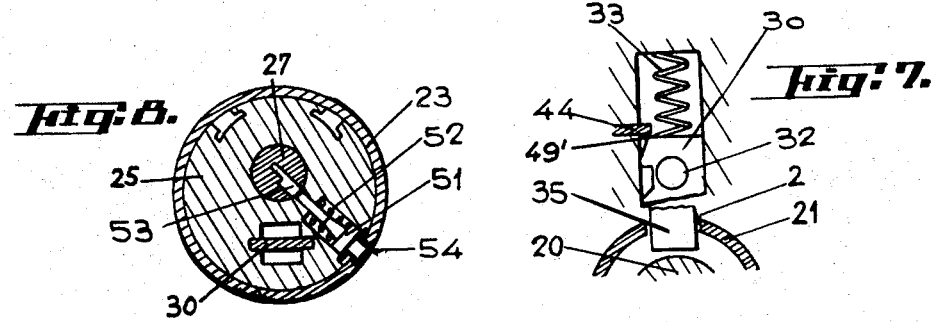

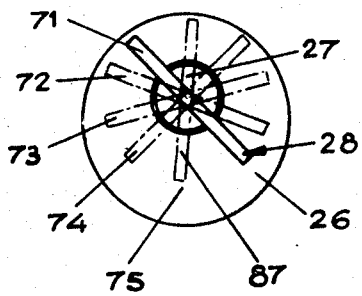
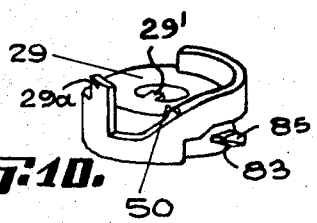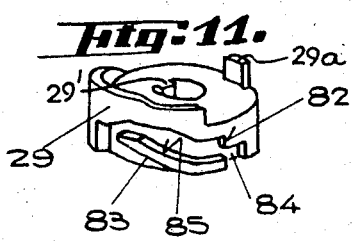
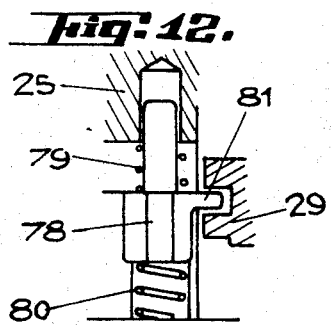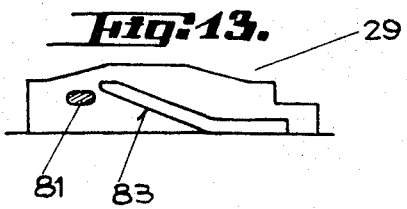
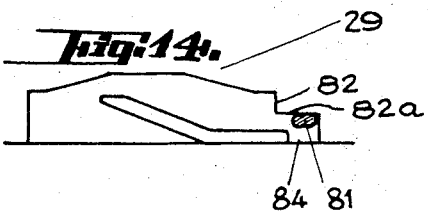
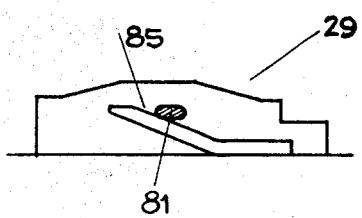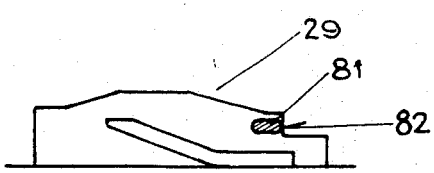
INVENTOR
BERTRAND A. WARNOD
BY: Nolte and Nolte
ATTORNEYS

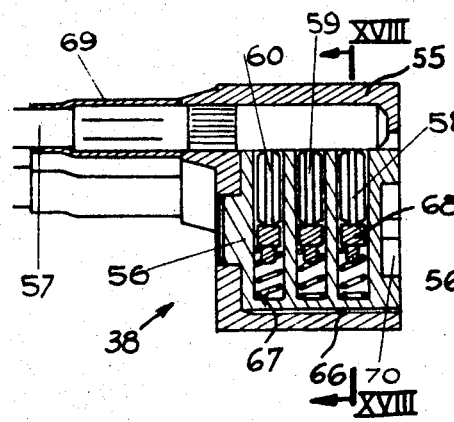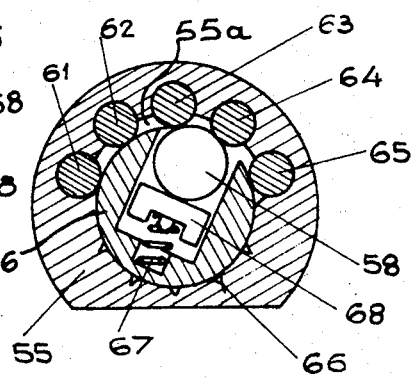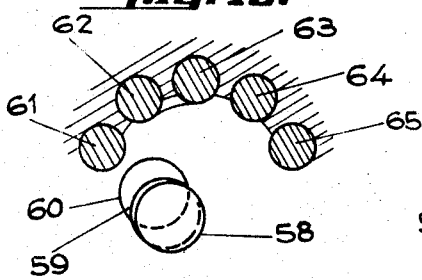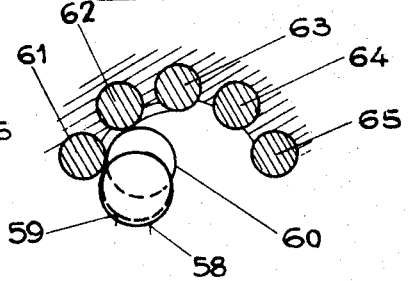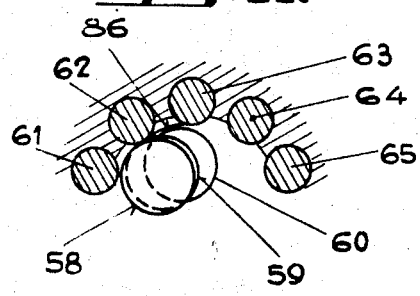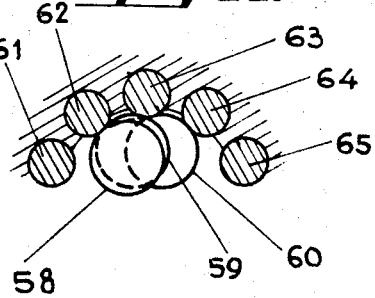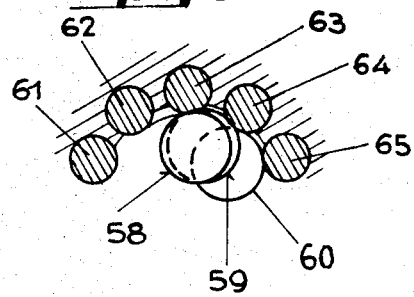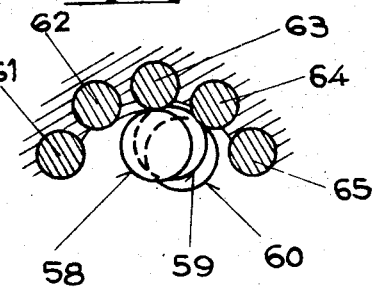

United States Patent Office 3,530,697
Patented Sept. 29, 1970

3,530,697
LOCKING DEVICE, IN PARTICULAR FOR THEFT PREVENTION ON AUTOMOTIVE VEHICLES
Bertrand Antoine Warnod, 30 Rue Charles Lafitte, Neuilly-sur-Seine, France
Filed Jan. 2, 1968, Ser. No. 695,158
Claims priority, application France, Oct. 5, 1967, 123,357
Int. Cl. E05b 65/12; B60r 25/02
U.S. Cl. 70—252                                    19 Claims

ABSTRACT OF THE DISCLOSURE

An anti-theft device on a motor vehicle for locking the steering-wheel shaft while simultaneously breaking all electric circuits, comprising a cartridge-like assembly mounted in a socket-like holder integral with the steering-column and including a safety-lock operable by a removable key which may successively assume a "stop," a "parking," a "run," and a "start" position, a retractable snap-bolt actuated by said safety-lock and insertable, when extended, into a clasp integral with said shaft, and a rotary switch controlling at least the electric ignition and start circuits and operable in unison with said lock.

---

The present invention essentially relates to a releasable locking device for selectively securing a movable element against motion and is more specifically concerned with anti-theft or anti-joy ride appliances for use on any kind of land, floating or flying automotive vehicle, such for example as automobiles and motor cars, motor boats and aircrafts, driven by for example an electrically started engine, such as an internal combustion either spark ignition or Diesel engine, the operation of which is preferably responsive to at least one electric control circuit. Such devices are intended to prevent any unauthorized use of said vehicles when the latter are at rest with the engine stopped. Said devices may, of course, be also used on stationary equipments or systems, such as various kinds of machines and apparatus, as well as on any kind of closures, such as doors, windows, safe-deposit boxes, covers, panels, shutters, and the like.

One main object of this invention is therefore to provide a device of the type set forth hereinabove, which form a removable cartridge-like unit of a very small size and which is adapted to lock an essential mechanical part, appliance or arrangement, more especially in a vehicle, such as the steering-wheel shaft or spindle or the gear-shift lever or the brake lever while simultaneously breaking or opening any electric control circuit requisite for starting or running the vehicle.

Consequently, a further object of the invention, is to provide an anti-theft device wherein the locking mechanism is coupled or combined with the control means for the starting circuit or for the fuel injection or feed pump for example, said device being operable preferably by means of a removable hand actuated member and only by the latter.

Still another object of the invention is to provide a device of the type referred to hereinabove which is adapted to be mounted in any desirable relative position without limiting or restraining the orientation of the housing accommodating said device, so that the latter may be secured in any selected location for example on the casing, sheath or ornamental jacket of the steering-column, in the gear-box or on the brake.

For this purpose, the device according to the invention comprises a cartridge-like assembly adapted to be removably inserted and housed within a socket-like holder or support, rigidly affixed to a stationary structure, for example to the steering-column and including a safety-lock consisting of a stationary body, of a substantially cylindrical plug rotatably mounted in said body and formed with an axial keyhole and of a key responsive spring-loaded pin or disk-tumbler mechanism housed in said body and engageable with said plug for locking same, whereby said plug is operable only by a removable key for being reversibly turned into any one of several spaced angular set positions from and to a first outgoing locking, so-called "stop" position; an elongated snap-bolt slidably mounted in a fixed structure associated with said safety-lock for longitudinal motion between an operative outside projecting locking position and an inoperative inwards retracted position, said snap-bolt being loaded by a biasing spring urging said snap-bolt towards its operative outwards moved position; a rotary bolt-actuating member operatively connected to said plug and adapted to cooperate with said snap-bolt for retracting same into its inoperative position through rotation of said key from its "stop" position; and spring-loaded bolt-catch means movably mounted in said body for automatically engaging a corresponding stop portion on said snap-bolt in the inoperative retracted position of the latter, so as to positively and irreversibly retain same therein for any angular position of the key remaining in said plug, said key being engaged by said catch means in said "stop" position until withdrawal of said key, causing said catch means to be tripped for disengaging and releasing said snap-bolt.

Preferably, the device or assembly according to the invention also comprises a rotary electric switch associated with said safety-lock and operable in unison with the latter by said key for controlling one or several electric circuits, such as for example an ignition circuit and a starting circuit. The rotary system of the device according to the invention may therefore preferably assume at least four successive separate angular positions, namely:

(1) A first or "stop" position wherein the key is removable from said safety-lock, said snap-bolt is ready, upon withdrawal of said key, to spring into its operative outward extended position, locking for example the steering-wheel shaft, and all electric circuits are open;

(2) A second or "parking" or "idle" position, wherein said key is still removable from said safety-lock, said snap-bolt is positively retained in its inoperative retracted position thereby unlocking said steering-wheel shaft, and all electric circuits remain broken;

(3) A third or "run" or "contact-making" position, wherein said key is positively retained within said safety-lock, said snap-bolt is still positively retained in its inoperatve retracted position and one electric circuit, in particular the ignition circuit, is closed or switched on, whereas the other or starting circuit remains open;

(4) A fourth or "start" position wherein said key is still positively retained within said safety-lock, said snap-bolt is also still retained in its inoperative retracted position, said ignition circuit remans open and said starting circuits switched on.

The device according to the invention is simple of construction, economical in manufacture, efficient and reliable in operation.

The invention will be better understood and other objects, features and advantages thereof will appear as the following detailed description proceeds, with reference to the accompanying diagrammatic drawings, given only by way of examples, illustrating several embodiments of this invention, and wherein:

FIG. 1 is a view in longitudinal section of the anti-theft device according to an embodiment of this invention, mounted on the steering-column of an automotive vehicle;

FIG. 2 shows a cross-section through the safety lock, taken upon the line II—II of FIG. 1, at the level of the bolt spring-latch in the position thereof corresponding to FIG. 1;

FIG. 3 is a fragmentary side elevational view in section, taken upon the line III—III of FIG. 1, showing the snap-bolt in its inoperative retracted or unlocking position, corresponding to FIG. 2 when the key is in the safety-lock;

FIG. 4 is a cross-section similar to FIG. 2, illustrating the position of the movable parts in the stage of the withdrawal of the key;

FIG. 5 is a partial view similar to FIG. 3 but showing the snap-bolt in an intermediate position, during the rotary shift of the key from the "stop" position to the "parking" position;

FIG. 6 is a further cross-section similar to FIG. 2 or 4 but showing the configuration after the key has been withdrawn in its "stop" position, the snap-bolt being locked in its operative outside protecting position;

FIG. 7 is a partial view similar to FIG. 3 or 5, showing the snap-bolt in its outward extended locking position, coresponding to FIG. 6;

FIG. 8 is a cross-section through the safety-lock mounted in its housing or socket integral with the steering-column tube with the locking finger securing and restraining the anti-theft device being shown engaged in the hole of the socket walls, in the state corresponding to the "parking" position of the key;

FIG. 9 is an external end view of the top face of the anti-theft device, illustrating the various possible angular positions of the key;

FIG. 10 is a perspective view of the rotary bolt-actuating member, showing the cam contour adapted to shift or retract said snap-bolt;

FIG. 11 is a similar view, of said bolt-actuating member in a different angular position thereof, showing the guide ramp and stop of a safety-catch or locking means preventing the key from assuming the "start" position when the engine is already running;

FIG. 12 is a longitudinal sectional partial view showing said safety-catch or locking means co-operating with said bolt-actuating member while engaging a guide groove thereof;

FIG. 13 is an external front elevational view, at an enlarged scale, of the bolt-actuating member, showing the relative positions of said safety-catch means and guide ramp and stop portion in the "stop" position of the safety-lock;

FIG. 14 is a view similar to FIG. 13, illustrating the relative positions of said safety-catch means and its guide ramp on the bolt-actuating member when the key is in its "start" position;

FIG. 15 is a view similar to FIG. 13 or 14 illustrating the relative positions of said safety-catch means and of its guide ramp on said bolt-actuating member in the "run" position of the key;

FIG. 16 is a view similar to FIGS. 13 to 15, illustrating the intermediate relative positions of the safety-catch means and its associated guide ramp on said bolt-actuating member during the rotary backward motion of the key returning to its "stop" position;

FIG. 17 is a longitudinal sectional detail view on an enlarged scale of the electric switch shown on FIG. 1;

FIG. 18 is a cross-section taken upon the line XVIII—XVIII of FIG. 17;

FIG. 19 is a diagrammatic fragmentary cross-sectional partial view similar to FIG. 18 showing the electric switch with its free moving roller contacts in its open position corresponding to the "stop" position of the key, wherein all circuits of the vehicle are cut out;

FIG. 20 is a view similar to FIG. 19, showing the position of the movable roller contact for the "outfits" position of the key wherein they close the auxiliary circuits, for instance the radio circuit of the vehicle;

FIG. 21 is a view similar to FIG. 20 or 19, showing the position of the movable roller contacts for the "parking" position of the key, wherein they cut out or open all the electric circuits;

FIG. 22 is a view similar to FIGS. 19 to 21, showing the position of the movable contact rollers for the "run" position of the key wherein the ignition circuit is closed;

FIG. 23 is a view similar to FIGS. 19 to 22, showing the position of the moving contact rollers for the "start" position of the key wherein the ignition circuit and the starting circuit are both closed;

FIG. 24 is a similar view showing an intermediate position of the contact rollers during the return motion of the key from the "start" position.

Referring now to FIG. 1 of the drawings, the reference numeral 22 denotes the hollow or tubular steering-column of a motor vehicle, surrounding with clearance the steering-wheel shaft or spindle 20 which is freely rotatable therein and carries a sleeve-like part 21 surrounding the shaft 20 and integral therewith by being for example welded thereto. The sleeve or bush 21 is formed on its side wall with at least one slot or like opening 2 adapted to receive therein the free outer end or tip of the snap-bolt 35 of the locking device according to the invention (generally designated by the reference numeral 1) when said snap-bolt is in its extended operative locking position shown in dash-dotted lines on FIG. 1 (wherein the solid lines shows the snap-bolt in its inoperative retracted position). A socket-like bracket or holder 23 is rigidly secured as by welding to the outside of the steering-column 22 in substantially registering relationship with an aperture 10 provided in the wall of said steering-column for the passage of the snap-bolt 35. This registering relationship should preferably be achieved for a slight turning angle of lock of the steering-wheel.

The assembly removably housed in the socket-like bracket or holder 23 comprises a cylinder safety-lock consisting of a stationary body 25 slidably fitted into the holder 23 and provided at its outer end with a peripheral flange abutting against the corresponding end of the holder 23 to prevent said body 25 from moving further inwards into said holder. After its insertion into said holder, the body 25 is locked in place by a special locking system to be described hereinafter and illustrated on FIG. 8. A clamping screw 41 extends through a corresponding hole of the tubular wall of the holder 23 and is threaded radially into the body 25 so as to remove any mounting play or lost motion of the assembly.

In a longitudinal bore of the body 25 is rotatably mounted a cylinder or plug 27 formed with a keyhole adapted to receive a specially contoured key 28 by means of which and only thereby, the plug may be turned owing to the presence of a special plug locking mechanism which may be of the pin-tumbler or of the disk-tumbler type. The pin-tumbler mechanism comprising for example 6 segmented spring-loaded pins consisting each one of a pair of aligned pin segments slidably mounted in a pair of radial bores respectively provided in the body 25 and in the plug or in a cylinder 27 of the safety-lock and which, upon rotation of said plug, may be brought into registering relation to each other. The pin segments and their corresponding radial bores in the plug are of differing lengths and are loaded each one by a spring located within the corresponding bore in the body and acting upon the pin segment. Each radial bore extends fully through the wall of the body and plug, respectively, so as to open through the lateral radially outer and inner surfaces defining said wall. The pins and their springs are insertable through the orifices of said radial bores in the radially outer lateral surface of the body and are kept in position therein by a retaining slip or strip slidably mounted in a corresponding longitudinal groove 8 formed in the outer periphery of said body, which groove may be either of rectangular cross-section or of dove-tailed cross-section as shown on FIGS. 2, 4, 6 and 8. The slip or strip is restrained either by a removable cap or cover 26 (FIG. 1) affixed to the upper end of the body 25 or by a peripheral flange of said body whereby the groove 8 is closed at its upper end, whereas its lower end may be either blind or closed by a stationary abutment or by a shoulder of the structure surrounding said body. Since the radial bores in the plug open each one into the keyhole, each pin segment is urged by its associated spring to project into the keyhole in the absence of the key 28, whereby the inner cylinder or plug 27 is prevented from rotating because the radially outer pin segments extend into the plug thereby locking it securely. When the correct key 28 is inserted into the keyhole, each notch or ward of the key has pushed back the radially inner pin-tumbler segment 5 outwards to the lateral surface of the plug so that all the joints between the pairs of pin segments are all located within the interference between. Hence, the plug is free to rotate. In the position of the key and inner cylinder or plug, which corresponds to the aforementioned first or "stop" position, the key may be easily removed or withdrawn from the keyhole since the radially inner pins 5 are freely slidable in their respective registering radial bores within the plug and the body 102. When the key, hence the plug is turned to any other angular position, said radial bores in the plug come out of alignment and are no longer registering with their corresponding radial bores within the body 102, so that each pin segment is retained in position by its engagement with the inner plain lateral surface of the body 102 whereby said pin segments which are thus fixedly engaging the corresponding wards or notches of the key 111, lock said key within the plug and prevent it from being withdrawn unless the plug is returned by rotating the key to said "stop" position.

However it should desirably be possible to also remove the key in the second or so-called "parking" position thereof, said position being usually spaced by about 90° from the first or "stop" position, so that a second pin- or disk-tumbler mechanism will generally be provided in said "parking" position. Therefore, the key is removable from the plug only in two angular positions thereof while being securely locked therein in any other angular position.

Referring again to FIG. 1, the snap-bolt 35 is slidably mounted into a tubular guide or sleeve 36 so as to form a lower extension thereof. The free end of said bolt guide member 36 extends into the aperture 10 of the tubular steering-column 22. The snap-bolt is thereby longitudinally movable in a direction substantially parallel to the axis of rotation of the key or lock plug. At its rear or inner end, the snap-bolt 35 is connected, for example by means of a cottered joint with a gooved straight round pin 34, to an elongated element 30 extending endwise from the snap-bolt into a corresponding longitudinal recess of the lock body 25. This element 30 consists for example of a flat strip or plate and is acted upon at its free end by a thrust-spring 33 mounted in said recess and urging the snap-bolt 35 towards its operative outward extended position. Stop means (not shown) are provided to co-operate with the element 30 so as to limit the outward travel of the snap-bolt 35 to the position 35' shown in dash-dotted lines on FIG. 1 wherein the bolt end remains spaced from the steering-wheel shaft 20.

A rotary bolt-actuating member 29, for retracting the snap-bolt 35, is securely affixed to an extension of the plug 27 and consists of a cam engageable with a cam follower 32 carried by said elongated element 30 and preferably formed by a roller supported by and rotatable about a pin or axle 31 integral with element 20.

A rotary electric switch 38, shown at a larger scale on FIG. 17 and consisting of a stator 55 and of a rotor 56 made of insulating material, is mounted at the lower end of the lock body 25 and projects at least partially into the guide bush or sleeve 36. The switch rotor is operatively connected in coaxial relationship to the aforesaid plug extension which, for this purpose, terminates by a cross-shaped end portion engaging a corresponding hole or recess 70, of complementary configuration, formed in the switch rotor for achieving a positive drive thereof. The lock body 25 is provided at its bottom end with a suitable opening for the passage of the electrical connecting cables, loads or conductors 37 leading to the switch 38.

The bolt guide bush or sleeve 36 could be possibly replaced by a s suitable shield or protecting cover or cap comprising an outlet and a guide bearing orifice for the snap-bolt 35.

There is provided a spring-loaded bolt-catch means adapted to positively and irreversibly retain the snap-bolt in its inoperative retracted position and which consists of a reciprocally slidable snap-latch member 44 mounted in said lock body 25 so as to be radially movable therein, substantially at right angles to the axis of rotation of the plug 27 (FIGS 2 to 7). The snap-latch member 44 consists for example of a plate element slidably mounted in a radial guide slot of the body 25 opening into the longitudinal bore thereof containing the plug 27, said member 44 being urged by a coil spring 45 bearing against the plate element 46 forming a spring rest or seat, to project into said bore of the body 25. The radially outer end portion of the latch member 44 is desirably enlarged or widened at least on one side thereof, as well as the corresponding portion of its guide slot so as to form a sidewise protruding stop engageable with a corresponding wall portion of said guide slot to limit the extent of inward travel of the latch member 44. On a level with said latch member 44, said rotary plug 27 is formed, on at least one portion of its periphery, with a circumferential groove (FIGS. 2, 4, 6) engageable by the radially inner end of the latch member 44 and wherein opens the corresponding portion of the keyhole 53 in said plug, whereby said latch member 44 may project at least partially into said keyhole. The angular position of said latch member 44 about the axis of rotation of the plug 27 is such that it registers substantially with the back web edge of the key 28 in the "stop" position of the latter.

As shown on FIGS. 2 to 7 of the drawings, the latch member 44 is also engageable by another portion thereof with the elongated element 30 which is therefore formed with two stop portions 49, 49' adapted, through alternate engagement with said latch member 44, to positively retain the snap-bolt 35 in its inoperative retracted position and in its operative extended position, respectively. The stop portion 49 may be formed by a suitable cog, jag, nick, nock, or like notch provided in the edge of element 30 whereas the second stop portion 49' may merely consist of the terminal face of at the free end of element 30. Both of said stop portions 49, 49' are preferably connected by a sloping ramp portion 48 formed by a bevel or skew edge part of element 30 and extending away from the longitudinal axis of element 30 towards the stop portion 49, so as to constitute a kind of guide ramp assisting the movement of the latch member 44.

The key 28 is formed with a bolt-triggering off portion which, upon withdrawal of said key, engages and trips the latch member 44. For this purpose, the key 28 has its back web edge, which is opposite to its wards formed with a notch or like indentation 43 for receiving therein the radially inner end portion of the latch member 44 when the key is in the keyhole 53, and said latch member 44 is in its released position. The notch 43 of the key 28 is followed, towards the tip of the key, by an adjacent raised edge portion 42 connected to said notch preferably by a sloping rounded part, and which forms said bolt-triggering off portion of the key.

A helical or spiral torsion spring 9 is mounted in a corresponding recess of the lock body 25 so as to coaxially surround the plug 27. This torsion spring is prestressed and both opposite ends thereof are bearing against corresponding suitable abutments integral with the body 25. Thus, one end 40 of said torsion spring 9 bears against a protruding abutment 12 of the body 25, so as to extend therebeyond into a recess 13 of the body 25. This projecting end 12 is engageable with a corresponding part of the rotary assembly consisting of the plug 27, the bolt-actuating member or cam 29 and the switch rotor 56. The spring 9 acts as a return-spring for urging said rotary assembly back from the aforementioned "start" position to the aforesaid "run" position upon release of said key, said spring being stretched only during the reverse rotation of said assembly from said "run" position to said "start" position.

As shown on FIGS. 10 and 11, the bolt actuating cam member 29 consists of a disk-like plate keyed for example by a feather or spline 29' onto said extension of the plug 27 whereon it is clamped against a shoulder thereof by a retaining ring or spring clip 39. The disk 29 is formed along at least one portion of its periphery with an upstanding substantially cylindrical flange or raised edge projecting upwards in substantially parallel relation to the axis of rotation thereof. The top face of said flange forms a cam profile 50 adapted to co-operate through sliding or rolling contact with the cam follower roller or tit 32 of the snap-bolt and this cam profile is so contoured as to fully retract said snap-bolt 35 into its inoperative position before passing the angular set or "parking" position next to said "stop" position when turning said key away from the latter and to leave said snap-bolt in its inoperative retracted position for any angular position of said key beyond said "parking" position. The cam member further comprises an upright lug or keeper projection 29a forming a moving abutment engageable with the end 40 of the return spring 9 in the direction where said end 40 leaves its stationary abutment 12, when the cam reaches said "run" position while rotating towards said "start" position.

The device operates as follows: Assuming initially the snap-bolt in its inoperative retracted position shown on FIG. 1 and the key 28 inserted in the keyhole 53 in the aforesaid "stop" position of the plug 27, the latch member or detent 44 projects, under the push action of its biasing spring 45, into the keyhole 53 and into the confronting key notch 43 enabling the latch member 44 to be radially displaced inwards to its greatest possible extent, whereby said latch member 4 engages the cog or stop portion 49 of the bolt shank element 30 (see FIGS. 2 and 3), so that the bolt 35 is positively retained in its inoperative retracted position, disengaging and freeing the steering-wheel shaft 20, while compressing its thrust-spring 33. As soon as the withdrawal of the key 28 is initiated, the latch member or detent 44 is pushed back by the raised tooth or projecting portion 42 of the key 28, following its notch 43, whereby the latch member 44 is moved into the position of FIGS. 4 and 5 wherein it begins to disengage and release the snap-bolt 35 which springs forward. If the steering-wheel shaft is in a position where the slot 2 of its bolt-clasp 21 is not in front of the snap-bolt 35, the latter, under the thrust of its spring 33, engages the outer surface of the clasp 21 (FIG. 5) until the slot 2 registers with the bolt so that the latter may project therethrough and come in its fully operative extended position 35' shown on FIGS. 1 and 7. Upon complete withdrawal of the key 28, the latch member 44 is again pushed forward by its spring 45 into the keyhole 53, whereby the corresponding portion thereof comes immediately behind the stop portion 49' formed by the free end face of the bolt shank 30, so that the bolt is positively prevented from moving backwards and out of the bolt-clasp 21. Assuming now the bolt in its operative extended position, when the key 28 is inserted into the keyhole and turned for example in the clockwise direction, the cam follower or roller 32 becomes engaged by the cam profile 50 thereby retracting the bolt 35 into its inoperative position as shown on FIG. 3. Of course, when the key 28 is inserted into the keyhole 53, the latch member 44 is allowed to snap into the keyhole and into the key notch 43 thereby still locking the bolt 35 in its operative outward extended position. However, once the key is turned clockwise together with the plug 27, owing to the fact that it has not a circular cross-sectional contour within the groove registering with the latch member 44, it acts upon the latter as a cam and pushes the latch member 44 back, i.e. radially outwards, while overcoming the force exerted by its spring 45, thereby clearing and freeing the backward or inward way of the bolt 35. The retraction of the bolt is caused by the cooperation of the inclined portion of the cam profile 50 with the cam follower 32 until it reaches the level top portion of said cam profile 50 which thereby retains the snap-bolt 35 in its retracted position for any angular position of the plug 27 different from the aforesaid "stop" position and in which said latch member 44 abuts against the outer surface of the plug 27. When said plug pushes said latch member 44 back, i.e. radially outwards, such outward travel of the latch member 44 needs only be sufficient to clear the adjacent end edge corner of the bolt shank 30 since thereafter, the latch member 44 engages the inclined ramp portion 48 which further moves the latch member 44 outwards.

Of course, when turning the key 28, the electric switch 38 is operated in unison with the plug 27. In the "stop" and "parking" positions, in particular the ignition circuit and the starting circuit are both dead, whereas in and beyond the "run" position, the ignition circuit is closed while the starting circuit remains dead. When turning the key 28 from the "run" position towards the "start" position, the ignition circuit remains closed and the lug or keeper portion 29a of the cam 29 engages the free end 40 of the torsion spring 9 thereby further stressing the spring until the key reaches the "start" position wherein the starting circuit is caused to be closed. As soon as the key is released, it automatically springs back under the action of the return spring 9 which restores the whole rotary assembly to the "run" position.

FIG. 8 shows an arrangement for securely locking the body 25 in place within the socket-like bracket or holder 23. This arrangement includes a locking tappet or finger 51 slidably mounted for longitudinal motion within a radial bore extending through the wall of the body 25 so as to open through its lateral inner and outer surfaces, respectively. A helical spring 52, surrounding the finger 51, is located between a bottom inner shoulder of said bore and a collar integral with said finger so as to urge the latter radially outwards. The finger 51 is retained within the body 25 by a washer or like fastener inserted in a spotface of the lateral outer surface of the body 25. In the fully outwards extended position of the finger 51, wherein said finger abuts by an integral shoulder or collar thereof against said washer or fastener, the radially outer end of said finger is inserted into a corresponding through-hole 54 of the side wall of said tubular holder 23 whereas said finger 51 is engageable by its opposite or radially inner end with the lateral outer surface of the plug 27 before leaving the hole 54. At the level of said finger 51, the keyhole 53 opens through the lateral peripheral surface of the plug 27 and may be engaged by the radially inner end of the finger 51 when the latter is pushed radially inwards therein in the absence of the key, when the keyhole registers with the finger 51. The angular position of the radial finger 51 is so selected within the body 25 about the axis of rotation of the plug 27 that the keyhole opening registers with said finger in the "parking" position of the rotary assembly. To insert the lock 25 into the holder 23 or to remove it therefrom, the proper key 28 should be inserted into the keyhole 53 and turned to the "parking" position wherein the snap-bolt is still in its inoperative retracted position. Then the key is withdrawn from the plug 27 and the finger is pushed endwise radially inwards, by acting upon the radially outer end thereof, so as to move the radially inner end portion of the finger 51 into the keyhole 53, whereby the radially outer end of the finger 51 is retracted within the body 23 or at least comes flush with the lateral outer surface of said body. The lock may then be inserted into or removed from the holder 23 in the absence of the clamping screw 41. Once inserted into the holder 23 and upon release of the finger 51, the latter snaps into the through-hole 54 of the holder 23 under the action of its biasing spring 52 thereby locking the body 25 securely in place. In any angular position of the plug 27, different from the "parking" position, the finger 51 cannot be pushed radially inwards to clear the hole 54 since said finger will engage the lateral surface of said plug 27.

The device according to the invention desirably comprises means for positively preventing the rotary assembly thereof from being shifted again into said "start" position after having been spring-returned to said "run" position without having previously come back to the "stop" position. Such safety means are intended to prevent any undue closing of the electrical starting circuit, i.e., energizing the starting motor of the vehicle engine, when said engine is already running, so as to avoid any damaging of the starting motor and of the starting gear or transmission. Said safety means desirably consist of a locking element 78 reciprocally displaceable longitudinally without any rotation about its longitudinal axis, between two mutually opposing biasing preferably prestressed springs 79 and 80, according to a linear travel substantially parallel to the axis of rotation of the rotary assembly or plug of the device, as shown on FIG. 12. The locking element 78 is e.g. slidably mounted in a corresponding recess of the body 25 and subject to the opposing forces of said springs 79 and 80 acting in substantially aligned relationship. The locking element 78 is formed with an integral sidewise projecting snug or spigot 81 freely engageable slidably, at least temporarily and successively, with two co-extensive ramp profiles forming preferably both opposite edges 83 and 85 of a same ramp and also with a unidirectional stop 82, respectively. As shown on FIGS. 10, 11 and 13 to 16, the ramp 83, 85 and the stop 82 are preferably formed on the peripheral surface of the cam member 29 so that said ramp 85, 85 defines and separates on either side thereof two guideways or passageways for the snug or spigot 81, which meet and merge together above opposite ends of said ramp, thereby defining an endless path in the form of a closed loop for said snug. One of said guideways and preferably the upper one includes said stop 82 and is followed by the snug 81 during the rotation of the cam 29 from the "run" position to the "stop" position, whereas the other or lower guideway is taken by said snug in the reverse direction when said cam is rotated from the "stop" position towards said "run" position. On FIG. 12, the locking element 78 is shown in its relative neutral or mean balanced position between the two counteracting springs 79 and 80, so that the locking snug 81 is out of engagement with either ramp profile 83 or 85 of the cam 29. FIG. 9 shows e.g. the various possible angular positions of the key 28 with respect to the top face 26 of the safety-lock, which are successively in the clockwise direction: the "stop" position 71, the "outfits" position 87, the "parking" position 74, the "run" position 73, the "start" position 72.

The locking arrangement of FIG. 12 operates then as follows: in the "stop" position of the rotary assembly, the cam member 29 is in the relative position shown on FIG. 13 with respect to the snug 81 which is movable in the vertical direction only on the drawing and which is then out of engagement with any portion of the cam member 29. When the key 28 is turned clockwise upon starting from its "stop" position 71, the lower ramp profile 83 of the cam member 29 will engage the snug 81 and move it vertically downwards while overcoming the pressure force exerted by the spring 80. When the key 28 reaches the "start" position 72, the cam member 29 has come into the angular position shown on FIG. 14 wherein the snug 81 has left the ramp profile 83 to arrive at the inlet of the passageway or clearance 84 of the cam member 29, so that under the pressure force exerted by the spring 80 upon the locking element 78, the snug 81 has moved upwards in said clearance of the cam member 29 until it abuts against a substantially horizontal flange 82a of the part 29. If the key 28 is then released, the torsion spring 9 returns the cam member 29 to the "run" position of the lock by shifting the cam member 29 from left to right on FIG. 14, so that the snug 81, upon leaving the horizontal flange, rib or shoulder 82a, is raised or lifted vertically upwards by the spring 80 into a corresponding recess or cut-out of the cam member 29 thereby reaching the position shown on FIG. 15 wherein the snug 81 is placed in front of the stop means 82 formed for instance by a projecting vertical ledge of the cam member 29. The stop means 82 prevents, by its engagement with the snug 81, the cam member from being rotated in the clockwise direction, i.e. from the left to the right on FIG. 15, so that it cannot return to the "start" position. The cam member 29 is thus stopped unidirectionally by the snug 81 which prevents its rotation in the clockwise direction but allows the rotation in the reverse or counter-clockwise direction. When the cam member 29 is brought back by means of the key 28 to the "stop" position 71, the upper ramp profile 85 of the cam member 29 engages the snug 81 as shown on FIG. 16 and vertically raises or lifts the snug 81 which assumes again, under the action of the upper spring 79 of FIG. 12, the initial equilibrium position shown on FIG. 14 after having moved past and beyond the corresponding end of the ramp profile 85, when the cam member 29 has come back to the "stop" position, so that a new operating cycle may be repeatedly started.

It should be noted that as soon as the rotary assembly of the whole device has been returned by the torsion spring 9 into the "run" position from the "start" position, said spring does no longer exert any action upon the cam member 29. It will further be readily appreciated that due to the arrangement shown on FIG. 8 for automatically locking the body 23 in place within the holder 23 as soon as said body has been fully inserted therein, it is impossible to remove the device from the holder 23 without making use of a suitable key 28, so that only the owner of such a key may remove the anti-theft device.

FIGS. 17 to 24 show an embodiment of the electric switch 38 illustrated on FIG. 1. This switch 38 is a drum selector step-switch of the multipolar, single gang, multi-throw type for controlling and combining a plurality of electric circuits. The switch comprises a stationary part or stator 55 made of electrically insulating material and formed with a substantially cylindrical cavity or bore for receiving, housing and accommodating a rotary part 56 having substantially the shape of a cylindrical drum or barrel and rotatably mounted within the stator 55, the whole switch being positioned with respect to the body 23 so that the drum or barrel be substantially coaxial with the axis of rotation of the plug 27. The drum or barrel 56 is formed on its bottom or left end face with a central projection journalled into a corresponding bearing hole of the bottom or left wall of the stator 55 whereas the top or right end face of the drum is formed with a cruciform recess 70 adapted to receive the mating cross-shaped end of the plug extension for positively rotating said drum within the stator in either direction. The switch is adapted to control in particular the ignition and starting electrical circuits of the vehicle engine as well as auxiliary circuits. For this purpose the stator 55 includes a plurality of stationary contact pieces or studs which are for example the following:

The contact piece or stud 61, connected to one pole, for example to the positive pole, of the electric storage battery of the vehicle;

The contact piece or stud 62 connected to the various electric auxiliary equipments or outfits of the vehicle, such as the supply circuit of a radio set, etc.;

The contact piece or stud 63 connected to the ignition or spark coil and to the light circuit, etc.;

The contact piece or stud 64 connected to the same pole of the storage battery as the contact piece 61;

The contact piece or stud 65 connected to the supply or energizing circuit of the starting motor.

These contact pieces are connected to their various associated electric circuits by suitable cables, leads or conductor wires 57 and are protected by an insulating covering or sheath 69 (FIG. 17), so that the contact pieces or studs actually form the terminal clamps or binding posts of the switch. The contact studs 61 to 65 are preferably substantially cylindrical and extend in substantially parallel relation to the axis of rotation of the drum 56. They are arranged in the stator 55 in preferably uniformly spaced relationship along an arc of circumference substantially coaxial with said drum and project with at least a portion of their lateral surface into the cylindrical cavity of the stator, preferably in such a manner that the cylindrical surface, forming the geometrical envelope of and tangent internally to said contact studs, coincides with, or is slightly radially spaced from the lateral outer surface of said drum 56. To this end, that portion of the inner bore of the stator 55 into which project sidewise the contact studs 61 to 65, has a larger radius than that of the drum 56 while being concentric to the latter, so that void spaces or air gaps are left between the radially inwards projecting portions of said contact studs. Owing to these air gaps or void spaces 55a, the switch behaves like an air circuit-breaker thereby avoiding any erosion of the insulating material of the stator which receives the contact pieces, terminals or contact pins or plugs.

The drum or barrel 56, also made of electrically insulating material, includes at least two electrically conducting surface portions resiliently engageable with said contact pieces and having each one an effective circumferential contacting length sufficient to connect two successive contact pieces but insufficient to connect three of them. The number of said elecrically conducting surface portions depends upon that of the various possible switching combinations which it is desirable to achieve and said electrically conducting surface portions are so staggered axially and offset circumferentially with respect to each other that one and a same contact piece may be connected to both of the next preceding and the next following contact pieces, respectively, by said electrically conducting surface portions. Each electrically conducting surface portion preferably consists of the operative surface portion of a roller contact and in the case illustrated in the drawings, there are provided three roller contacts 58, 59 and 60 which are housed and slidably mounted for radial displacement in a corresponding recess of the drum 56 wherein they are urged outwards by an associated individual thrust-spring 67. Instead of roller contacts, use can also be made of spherical ball contacts or the like. For better guiding the roller or ball contacts during their radial or transverse sliding motion within their recess wherein they are preferably freely disposed while enabling them to oscillate and to revolve about themselves, an intermediate preferably shaped tappet-forming part 68 is interposed between each thrust-spring 67 and the associated roller or ball contact and slidably mounted in the relevant recess. The bore of the stator 55, receiving the drum 56, is desirably formed with a plurality of longitudinally extending grooves 66 for collecting the dust and dirt therein, so as to avoid any sticking or jamming of the drum 56. Owing to the axial spacing between the recesses receiving the roller or ball contacts and their circumferential staggering, the roller or ball contacts 58, 59, 60, when viewed in the axial direction of the drum, are seen as being offset with respect to each other in mutually overlapping position whereby they may each one simultaneously engage two contact pieces in the main operating positions. Thus, the switch forms an actual selector, combination or change-over switch the roller or ball contacts of which are pressed by their individual thrust-springs against the contact pieces with which the roller or ball contacts are in rolling engagement due to their capability of rotation about their own axis.

FIGS. 19 to 24 show various relative operating positions of the three roller or ball contacts 58, 59, and 60 of the rotary drum 56 with respect to the stationary contact pieces 61 to 65. Thus, on FIG. 19, the angular position of the drum 56 corresponds to the "stop" position 71 of the plug 27 or key 28 (FIG. 9), so that the roller or ball contacts are outside of the arc of circumference occupied by the contact pieces and are rolling on and along the solid inner wall surface of the bore of the stator 55. Accordingly, no electric contact is thus made, so that all the electric circuits are cut out or open.

On FIG. 20, the selector drum 56 is in a position corresponding to the "outfits" position 87 of the key wherein the roller or ball contact 60 makes the electrical connecting contact between the contact pieces 61 and 62 thereby enabling the supply of electric current to the accessories of the vehicle, such as the radio.

On FIG. 21, the drum 56 is in a position corresponding to the "parking" position 74 of the lock, wherein no electric contact is made because the contact piece 61 is set back and cannot be engaged by the roller or ball contacts 58 and 59, whereas an insulating boss 86, filling the space between the radially inwards projecting portions of the contact pieces 62 and 63, prevents the roller or ball 60 from engaging both of said contact pieces.

On FIG. 22, the position of the drum 56 corresponds to the "run" position 73 of the lock when coming from the "stop" position thereof, so that the contact pieces 63 and 64 are electrically connected by their engagement with the roller or ball contact 60 thereby enabling to energize the spark or ignition coil and the contact pieces 63 and 62 are electrically connected by the rollers or balls 59 and 60 simultaneously engaging said contact pieces, thereby enabling the electric supply of the radio for example.

On FIG. 23, the position of the drum 56 corresponds to the "start" position 72 of the lock, wherein the simultaneous engagement of the roller or ball 60 with the contact pieces 64 and 65 enables to achieve the electric supply of the starting motor, whereas the simultaneous engagement of the roller or ball 59 with the contact pieces 63 and 64 results in the electric supply of the spark or ignition coil and of the light circuits.

FIG. 24 shows an intermediate position of the drum 56 during its return motion from the "start" position of the lock. In this position, the roller or ball 59 remains in simultaneous engagement with the contact pieces 64 and 63, thereby allowing to energize the spark or ignition coil. At the end of this return motion towards the "run" position, which is automatically achieved by the torsion spring 40 of FIG. 1, the roller or ball 58 simultaneously engages the contact piece 63 of the ignition circuit and the contact piece 62 of the auxiliary circuits. Due to the switching on and switching off operations through rolling contacts, this switch offers the advantage of substantially reducing the wear of the stationary as well as of moving contact pieces, thereby increasing the lifetime and reliability of the switch. Moreover, owing to the axial spacing and to the circumferential staggering of the roller or ball contacts, outstanding electrical connections are always achieved even though the contact pieces are oxidized or damaged by electric sparks, more especially as the roller or ball contacts roll while revolving about themselves during their displacements. Alternatively, the roller or ball contacts could be replaced by frictional contact segments in sliding engagement with stationary contact pieces.

Each stationary contact piece or stud preferably consists of a cylindrical tubular terminal plug made from bent or rolled-up metal-sheet, the open inner end of which terminates into a flanged rim forming a clamping collar for being clamped into said stator whereas its open opposite end receives the tag or lug of the connecting leads 57 which are preferably secured by being clamped into a cable grip-like portion of said contact piece.

Instead of locking a steering-wheel spindle or shaft as in FIG. 1, the locking device according to the invention may be affixed in an inaccessible position within a socket provided on the gear-box or on the brake-housing, the snap-bolt being then adapted to engage a bolt keeper such as a perforated plate integral with the gear-shift lever.

It is to be understood that the invention should not be construed as limited to the forms of embodiment herein described and shown which have been given only by way of example since many modifications and variations may be resorted to by those skilled in or conversant with the art, within the scope of the invention as defined and set forth in the appended claims.

What is claimed is:

1. A releasable locking devices for selectively securing a movable element against motion and comprising: a cylinder-type safety-lock including a stationary body formed with a longitudinal bore, a substantially cylindrical rotary plug formed with an axial keyhole and mounted with close-running fit in the mating bore of said body and a key-responsive, spring-loaded tumbler mechanism housed in said body and engageable with said plug for locking same, whereby said plug is operable only by a removable key for being reversibly turned into any one of several spaced angular set positions from and to a first outgoing locking, so-called "stop" position; an elongated snap-bolt slidably mounted in a fixed structure associated with said safety-lock for longitudinal motion between an operative outside projecting locking position and an inoperative inwards retracted position and loaded by a biasing spring urging said snap-bolt towards its operative outwards moved position; said snap-bolt generally extending and being reciprocally movable in substantially parallel relation to the axis of rotation of said plug; a rotary bolt-actuating cam engageable with a follower carried by said snap-bolt operatively connected to said plug and adapted to co-operate with said snap bolt for retracting same into its inoperative position through rotation of said key from its "stop" position; and spring-loaded bolt-catch means movably mounted in a cavity of said body and urged into a bolt-retaining position to automatically engage a corresponding stop portion on said snap-bolt in the inoperative retracted position of the latter, so as to positively retain same therein at any angular position of the key remaining in said plug, said catch means consisting of a radially slidable snap-latch member, movable substantially at right angles to said axis of rotation and being provided with a radially projecting portion adapted to protrude into the bore of said body through a corresponding aperture thereof whereas said plug is formed with a peripheral groove registering with said aperture and into which opens said keyhole, whereby said projecting portion is insertable at least partially into said keyhole; said key being engaged by said catch means in said "stop" position and said key having its web back edge, which is opposite to its wards, formed with a notch for receiving said radially projecting porton of said catch means therein when said key is in the keyhole and said catch means is in its released position, whereas the raised edge portion of the key, adjacent to and following said notch towards the tip of the key, is connected to said notch by a sloping rounded portion and forms a bolt-triggering off portion of the key, which during withdrawal of said key engages said catch means and causes the latter to be tripped for disengaging and releasing said snap-bolt, said snap-bolt comprising at least another stop portion engageable in its fully outwards moved operative position with said snap-latch member upon removal of said key in its "stop" position, whereby said snap-bolt is positively retained in its extended operative locking position; and both of said stop portions of said snap-bolt are connected by a sloping ramp portion extending away from the longitudinal axis of said snap-bolt towards said first named stop portion; said snap-bolt being slidably movable in a tubular guide sleeve attached to said body in longitudinal extension thereof and being pivotally connected to an elongated tail strip element extending into a corresponding recess of said body where it is engaged by the spring loading said snap-bolt, said tail strip element being provided with said stop portions and cam follower.

2. A device according to claim 1, comprising an electric rotary switch for controlling at least one electric circuit, mounted adjacent to that end of said body which is opposite to the key, said switch including a stator and a rotor operatively connected with said bolt-actuating member for revolvnig in unison therewith and being adapted to close said circuit in one determined angular position of said rotor and to open said circuit when said rotor leaves said determined angular position while moving away therefrom, back towards said "stop" position; said cam being so contoured as to fully retract said snap-bolt into its inoperative position before passing the angular set position next to said "stop" position when turning said key away from the latter and to leave said snap-bolt in its inoperative retracted position for any angular position of said key beyond said angular set position.

3. A device according to claim 2 wherein the rotary assembly, consisting of said plug and key, of said bolt-actuating member and of said switch rotor, may assume by turning said key at least three successive separate angular positions, namely, said locking so-called "stop" position wherein each electric circuit is cut out, an unlocked so-called "run" position wherein said snap-bolt is in its inoperative retracted position and said electric circut is open and an unlocked, contact makng so-called "start" position wherein said snap-bolt is in its inoperative retracted position and said electric circuit is closed, a return sprng being provided for urging said assembly back from said "start" position to said "run" position upon release of said key and being stretched only during rotation of said assembly from said "run" position to said "start" position; said switch being adapted to open and close at least two electric control circuits and said rotary assembly being adapted to assume an intermediate angular, so-called "idle" position located between said "stop" and said "run" positions and in which said snap-bolt is in its retracted position and both circuits are open, whereas in said "run" position, one circuit is closed and the other open, and in said "start" position, both circuts are closed, said key being freely removable only in said "stop" and "idle" positions, respectively, while it is positively retained in said safety lock in the two other positions.

4. A device according to claim 3, comprising means for positively preventing said assembly from being shifted again into said "start" position after having been spring return to said "run" position without having beforehand come back to the "stop" position.

5. A device according to claim 4, wherein said means consist of a locking element reciprocally displaceable without any rotation between two mutually opposing biasing springs according to a linear travel parallel to the axis of rotation of said assembly, said locking element being formed with an integral sidewise projecting snug engageable, at least temporaily and successively with both opposite co-extensive edges of a same ramp and with a unidirectional stop, respectively, said ramp and stop being formed on said cam and said ramp defining and separating on either side thereof two guideways for said snug, which meet and merge together at both opposite ends of said ramp so as to define an endless path in the form of a closed loop for said snug, one of said guideways comprising said stop and being kept along by said snug during the rotation of said cam from said "run" position to said "stop" position, whereas the other guideway is taken by said snug in the reverse direction when said cam is rotated from the "stop" position towards said "run" position; said return spring being a helical spring mounted on a corresponding bearing portion of said body, coaxially surrounding said plug, said spring being prestressed by having its opposite ends freely engaging corresponding stationary abutments, one of said ends being engageable, in the direction where it leaves its abutment, by an upright projection of said cam when the latter reaches said "run' position while rotating towards said "start" position.

6. A device according to claim 2, wherein said switch is a multipolar, single gang, drum selector step switch for controlling and combining a plurality of electric circuits, the stator of which is made of electrically insulating material and is formed with a substantially cylindrical cavity accommodating the rotor and comprises a plurality of stationary contact studs affixed in said stator and arranged in parallel spaced relationship along an arc of circumference substantially coaxial with said rotor, said contact studs being parallel to the axis of rotation of said rotor and projecting with at least a portion of their lateral surface into said cylindrical cavity of the stator, whereas said rotor consists of a barrel made of electrically insulating material and including at least two electrically conducting surface portions resiliently engageable with said contact studs and having each one an effective circumferential contact length sufficient to connect two successive contact studs but insufficient to connect three of them, said elecrically conducting surface portions being so staggered axially and offset circumferentially with respect to each other that one and a same contact stud may be connected to both of the next preceding and the next following contact studs, respectively, by said electrically conducting surface portions; each one of said electrically conducting surface portions consisting of the operative surface portion of a roller contact slidably mounted for radial displacement in a corresponding recess of said barrel and urged outwards by an associated individual spring, whereas the cylindrical surface, forming the geometrical envelope of, and tangent to said contact studs, is radially spaced from said barrel.

7. A device according to claim 6 wherein the cylindrical surface of the cavity of said stator is formed with a plurality of circumferentially spaced longitudinal grooves.

8. A device according to claim 6 used as an anti-theft appliance on any kind of land, floating and flying automotive vehicle driven by an engine the operation of which is responsive to at least a first electric control circuit and which may be electrically started through a second electric control circuit, said device including said rotary assembly consisting of the plug of said safety lock, of said bolt-actuating member and of said switch rotor whereas said switch is adapted to selectively close and open each circuit, said assembly being adapted to assume at least four successive separate angular positions, namely: a first, so-called "stop" position wherein said key is removable from said plug, all electric circuits are broken and said snap-bolt springs into its outward extended locking position upon withdrawal of the key; a second, so-called "parking" position wherein said key is removable from said plug, all electric circuits are still cut out and said snap-bolt is retained in its inoperative retracted position; a third, so-called "run" position wherein the key is positively retained in said plug, said first electric control circuit is closed while the second one remains open and said snap-bolt is still in its retracted position; and a fourth, so-called "start" position wherein the key is still retained in said plug, said first electric control circuit remains closed and said second electric control circuit is closed, while said snap-bolt still remains in its retracted position.

9. A releasable locking device for selectively securing a movable element against motion and comprising: a cylinder-type safety-lock including a stationary body formed with a longitudinal bore, a substantially cylindrical rotary plug formed with an axial keyhole and mounted with a close-running fit in the mating bore of said body and a key-responsive, spring-loaded tumbler mechanism housed in said body and engageable with said plug for locking same, whereby said plug is operable only by a removable key for being reversibly turned into any one of several spaced angular set positions from and to a first outgoing locking, so-called "stop" position; an elongated snap-bolt slidably mounted in a fixed structure associated with said safety-lock for longitudinal motion between an operative outside projecting locking position and an inoperative inwards retracted position and loaded by a biasing spring urging said snap-bolt towards its operative outwards moved position; said snap-bolt generally extending and being reciprocally movable in substantially parallel relation to the axis of rotation of said plug; a rotary bolt-actuating cam engageable with a follower carried by said snap-bolt operatively connected to said plug and adapted to co-operate with said snap-bolt for retracting same into its inoperative position through rotation of said key from its "stop" position; and spring-loaded bolt-catch means movably mounted in a cavity of said body and urged into a bolt retaining position to automatically engage a corresponding stop portion on said snap-bolt in the inoperative retracted position of the latter, so as to positively retain same therein, at any angular position of the key remaining in said plug, said catch means consisting of a radially slidable snap-latch member, movable substantially at right angles to said axis of rotation and being provided with a radially projecting portion adapted to protrude into the bore of said body through a corresponding aperture thereof whereas said plug is formed with a peripheral groove registering with said aperture and into which opens said keyhole, whereby said projecting portion is insertable at least partially into said keyhole; said key being engaged by said catch means in said "stop" position and said key having its web back edge, which is opposite to its wards, formed with a notch for receiving said radially projecting portion of said catch means therein when said key is in the keyhole and said catch means is in its released position, whereas the raised edge portion of the key, adjacent to and following said notch towards the tip of the key, is connected to said notch by a sloping rounded portion and forms a bolt-triggering off portion of the key, which during withdrawal of said key engages said catch means and causes the latter to be tripped for disengaging and releasing said snap-bolt; said snap-bolt comprising at least another stop portion engageable in its fully outwards moved operative position with said snap-latch member upon removal of said key in its "stop" position, whereby said snap-bolt is positively retained in its extended operative locking position; and both of said stop portions of said snap-bolt are connected by a sloping ramp portion extending away from the longitudinal axis of said snap-bolt towards said first named stop portion; an electric rotary switch for controlling at least one electric circuit, mounted adjacent to that end of said body which is opposite to the key, said switch including a stator and a rotor operatively connected with said bolt-actuating member for revolving in unison therewith and being adapted to close said circuit in one determined angular position of said rotor and to open said circuit when said rotor leaves said determined angular position while moving away therefrom, back towards said "stop" position; the rotary assembly, consisting of said plug and key, of said bolt-actuating member and of said switch rotor, assuming by turning said key at least three successive separate angular positions, namely, said locking so-called "stop" position wherein each electric circuit is cut out, an unlocked so-called "run" position wherein said snap-bolt is in its inoperative retracted position and said electric circuit is open and an unlocked, contact making so-called "start" position wherein said snap-bolt is in its inoperative retracted position and said electric circuit is closed, a return spring being provided for urging said assembly back from said "start" position to said "run" position upon release of said key and being stretched only during rotation of said assembly from said "run" position to said "start" position; and means for positively preventing said assembly from being shifted again into said "start" position after having been spring returned to said "run" position without having beforehand come back to the "stop" position; said means consisting of a locking element reciprocally displaceable without any rotation between two mutually opposing biasing springs according to a linear travel parallel to the axis of rotation of said assembly, said locking element being formed with an integral sidewise projecting snug engageable, at least temporarily and successively with both opposite co-extensive edges of a same ramp and with a unidirectional stop, respectively, said ramp and stop being formed on said cam and said ramp defining and separating on either side thereof two guideways for said snug, which meet and merge together at both opposite ends of said ramp so as to define an endless path in the form of a closed loop for said snug, one of said guideways comprising said stop and being kept along by said snug during the rotation of said cam from said "run" position to said "stop" position, whereas the other guideway is taken by said snug in the reverse direction when said cam is rotated from the "stop" position towards said "run" position.

10. A device according to claim 9, wherein said return spring is a helical spring mounted on a corresponding bearing portion of said body, coaxially surrounding said plug, said spring being prestressed by having its opposite ends freely engaging corresponding stationary abutments, one of said ends being engageable, in the direction where it leaves its abutment, by an upright projection of said cam when the latter reaches said "run" position while rotating towards said "start" position.

11. A releasable locking device for selectively securing a movable element against motion and comprising; a cylinder-type safety-lock including a stationary body formed with a longitudinal bore, a substantially cylindrical rotary plug formed with an axial keyhole and mounted with a close-running fit in the mating bore of said body and a key-responsive, spring-loaded tumbler mechanism housed in said body and engageable with said plug for locking same, whereby said plug is operable only by a removable key for being reversibly turned into any one of several spaced angular set positions from and to a first outgoing locking, so-called "stop" position; an elongated snap-bolt slidably mounted in a fixed structure associated with said safety-lock for longitudinal motion between an operative outside projecting locking position and an inoperative inwards retracted position and loaded by a biasing spring urging said snap-bolt towards its operative outwards moved position; said snap-bolt generally extending and being reciprocally movable in substantially parallel relation to the axis of rotation of said plug; a rotary bolt-actuating cam engageable with a follower carried by said snap-bolt operatively connected to said plug and adapted to cooperate with said snap-bolt for retracting same into its inoperative position through rotation of said key from its "stop" position; and spring-loaded bolt-catch means movably mounted in a cavity of said body and urged into a bolt retaining position to automatically engage a corresponding stop portion on said snap-bolt in the inoperative retracted position of the latter, so as to positively retain same therein at any angular position of the key remaining in said plug, said catch means consisting of a radially slidable snap-latch member, movable substantially at right angles to said axis of rotation and being provided with a radially projecting portion adapted to protrude into the bore of said body through a corresponding aperture thereof whereas said plug is formed with a peripheral groove registering with said aperture and into which opens said keyhole, whereby said projecting portion is insertable at least partially into said keyhole; said key being engaged by said catch means in said "stop" position and said key having its web back edge, which is opposite to its wards, formed with a notch for receiving said radially projecting portion of said catch means therein when said key is in the keyhole and said catch means is in its released position, where as the raised edge portion of the key, adjacent to and following said notch towards the tip of the key, is connected to said notch by a sloping rounded portion and forms a bolt-triggering off portion of the key, which during withdrawal of said key engages said catch means and causes the latter to be tripped for disengaging and releasing said snap-bolt, said snap-bolt comprising at least another stop portion engageable in its fully outwards moved operative position with said snap-latch member upon removal of said key in its "stop" position, whereby said snap-bolt is positively retained in its extended operative locking position; and both of said stop portions of said snap-bolt are connected by a sloping ramp portion extending away from the longitudinal axis of said snap-bolt towards said first named stop portion; and an electric rotary switch for controlling at least one electric circuit, mounted adjacent to that end of said body which is opposite to the key, said switch including a stator and a rotor operatively connected with said bolt-actuating member for revolving in unison therewith and being adapted to close said circuit in one determined angular position of said rotor and to open said circuit when said rotor leaves said determined angular position while moving away therefrom, back towards said "stop" position, said switch being a multipolar, single gang, drum selector step switch for controlling and combining a plurality of electric circuits, the stator of which is made of electrically insulating material and is formed with a substantially cylindrical cavity accommodating the rotor and comprises a plurality of stationary contact studs affixed in said stator and arranged in parallel spaced relationship along an arc of circumference substantially coaxial with said rotor, said contact studs being parallel to the axis of rotation of said rotor and projecting with at least a portion of their lateral surface into said cylindrical cavity of the stator, whereas said rotor consists of a barrel made of electrically insulating material and including at least two electrically conducting surface portions resiliently engageable with said contact studs and having each one an effective circumferential contacting length sufficient to connect two successive contact studs but insufficient to connect three of them, said electrically conducting surface portions being so staggered axially and offset circumferentially with respect to each other that one and a same contact stud may be connected to both of the next preceding and the next following contact studs, respectively, by said electrically conducting surface portions.

12. A device according to claim 11, wherein each one of said electrically conducting surface portions is slidably mounted for radial displacement in a corresponding recess of said barrel and urged outwards by an associated individual spring.

13. A device according to claim 12, wherein each electrically conducting surface portion consists of the operative surface portion of a roller contact.

14. A device according to claim 13, wherein each roller contact is guided by an intermediate part, slidably mounted in the relevant recess of said barrel and interposed between said roller contact and its associated spring.

15. A device according to claim 11, wherein the cylindrical surface, forming the geometrical envelope of, and tangent to said contact studs, is radially spaced from said barrel.

16. A device according to claim 11, wherein each contact stud consists of a cylindrical tubular plug made of bent, rolled-up metal sheet, the open inner end of which terminates into a flanged rim forming a crimping collar for being clamped into said stator, whereas its open opposite end receives the tag of the connecting leads.

17. A device according to claim 11, wherein the cylindrical surface of the cavity of said stator is formed with a plurality of circumferentially spaced longitudinal grooves.

18. A device according to claim 11, used as an anti-theft appliance on any kind of land, floating and flying automotive vehicle driven by an engine the operation of which is responsive to at least a first electric control circuit and which may be electrically started through a second electric control circuit, said device including said rotary assembly consisting of the plug of said safety lock, of said bolt-actuating member and of said switch rotor whereas said switch is adapted to selectively close and open each circuit, said assembly being adapted to assume at least four successive separate angular positions, namely: a first, so-called "stop" position wherein said key is removable from said plug, all electric circuits are broken and said snap-bolt springs into its outward extended locking position upon withdrawal of the key; a second, so-called "parking" position wherein said key is removable from said plug, all electric circuits are still cut out and said snap-bolt is retained in its inoperative retracted position; a third, so-called "run" position wherein the key is positively retained in said plug, said first electric control circuit is closed while the second one remains open and said snap-bolt is still in its retracted position; and a fourth, so-called "start" position wherein the key is still retained in said plug, said first electric control circuit remains closed and said second electric control circuit is closed, while said snap-bolt still remains in its retracted position.

19. A device according to claim 18, for locking a steering-wheel shaft mounted in a steering-column and comprising a socket-like holder integral with the steering-column for receiving said safety-lock, switch and bolt works therein said snap-bolt being insertable into a slotted bolt-clasp integral with said steering-wheel shaft.

References Cited

UNITED STATES PATENTS

| | | | |
|---|---|---|---|
| 378,267 | 2/1888 | Taylor | 70—370 |
| 1,986,676 | 1/1935 | Ford | 70—224 |
| 2,008,662 | 7/1935 | Beehart | 70—224 |
| 2,039,244 | 4/1936 | Lowe | 70—368 |
| 2,285,511 | 12/1941 | Ledin | 70—371 |
| 3,090,219 | 5/1963 | Levin | 70—315 |
| 3,448,599 | 6/1969 | Schreiber | 70—371 |
| 3,172,968 | 3/1965 | Arendt | 200—44 |
| 3,304,380 | 2/1967 | Mitchell | 200—44 |
| 3,339,035 | 8/1967 | Heller | 200—44 |
| 3,358,093 | 12/1967 | Cryer | 200—44 |

FOREIGN PATENTS

| | | |
|---|---|---|
| 1,022,858 | 3/1966 | Great Britain. |

MARVIN A. CHAMPION, Primary Examiner

R. L. WOLFE, Assistant Examiner

U.S. Cl. X.R.

70—368